(12) United States Patent
Reynolds et al.

(10) Patent No.: US 9,897,419 B1
(45) Date of Patent: *Feb. 20, 2018

(54) K-9 TRAINING AIDS MADE USING ADDITIVE MANUFACTURING

(71) Applicant: LAWRENCE LIVERMORE NATIONAL SECURITY, LLC, Livermore, CA (US)

(72) Inventors: John G. Reynolds, San Ramon, CA (US); Matthew M. Durban, Livermore, CA (US); Alexander E. Gash, Brentwood, CA (US); Michael D. Grapes, Livermore, CA (US); Ryan S. Kelley, Byron, CA (US); Kyle T. Sullivan, Brentwood, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,101

(22) Filed: May 16, 2017

(51) Int. Cl.
| | |
|---|---|
| *C06B 45/00* | (2006.01) |
| *C06B 45/14* | (2006.01) |
| *D03D 23/00* | (2006.01) |
| *D03D 43/00* | (2006.01) |
| *F41H 11/132* | (2011.01) |
| *B33Y 10/00* | (2015.01) |
| *B33Y 80/00* | (2015.01) |
| *B29C 67/00* | (2017.01) |
| *A01K 15/02* | (2006.01) |

(52) U.S. Cl.
CPC ............ *F41H 11/132* (2013.01); *A01K 15/02* (2013.01); *B29C 67/0051* (2013.01); *B33Y 10/00* (2014.12); *B33Y 80/00* (2014.12); *C06B 45/14* (2013.01)

(58) Field of Classification Search
USPC ................................. 149/15, 2, 109.4, 109.6
See application file for complete search history.

(56) References Cited

U.S. PATENT DOCUMENTS

| | | |
|---|---|---|
| 5,359,936 A | 11/1994 | Simpson et al. |
| 5,413,812 A | 5/1995 | Simpson et al. |
| 5,648,636 A | 7/1997 | Simpson et al. |
| 5,958,299 A | 9/1999 | Kury et al. |
| 8,444,881 B2 | 5/2013 | Adebimpe |
| 9,108,890 B2 | 8/2015 | Vu |
| 2014/0097551 A1* | 4/2014 | Vu .......................... C06B 21/00 264/3.4 |
| 2015/0056913 A1 | 2/2015 | Foat et al. |

OTHER PUBLICATIONS

Levine, "The Education of a Bomb Dog," Smithsonian, 2013, 1 page.

* cited by examiner

*Primary Examiner* — James McDonough
(74) *Attorney, Agent, or Firm* — Eddie E. Scott

(57) ABSTRACT

Additive Manufacturing (AM) is used to make aids that target the training of K-9s to detect explosives. The process uses mixtures of explosives and matrices commonly used in AM. The explosives are formulated into a mixture with the matrix and printed using AM techniques and equipment. The explosive concentrations are kept less than 10% by wt. of the mixture to conform to requirements of shipping and handling.

14 Claims, 11 Drawing Sheets

K-9 TRAINING AIDS MADE USING ADDITIVE MANUFACTURING

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to training aids and more particularly to making K-9 training aids using additive manufacturing.

State of Technology

This section provides background information related to the present disclosure which is not necessarily prior art.

U.S. Pat. No. 9,108,890 for a process for producing non-detonable training aid materials for detecting explosives issued Aug. 18, 2015 provides the state of technology information reproduced below.

BACKGROUND

Example embodiments generally relate to producing non-detonable explosive samples and, more particularly, to producing such samples for use as training aids.

Non-detonable training aid materials have been developed for allowing training of explosives detection dogs (EDD), dolphins, or other living or non-living entities that can detect presence of explosives through emitted vapors. The training aid materials desirably exude the same odor as bulk quantities of real explosives, but lack the detonable properties of real explosives and are otherwise safe to handle. Furthermore, the training aid materials can preferably produce vapors that exude the odor for at least a specific period of time after opening the package (e.g., 2 hours). Such training aid materials have been developed for peroxide-based homemade explosives (HME) allowing for training EDDs to detect such explosives in various environments.

Some training aid materials are formed by coating materials with layers of the explosive molecules as dissolved in a solvent. These materials can similarly produce off-odors, however, due to addition of the solvent.

The article "The Education of a Bomb Dog" by Joshua Levine in the July 2013 issue of Smithsonian Magazine provides the state of technology information reproduced below.

Top training academy works double time to meet skyrocketing demand for canines who can sniff out danger.

Then I first meet a likable young Labrador named Merry, she is clearing her nostrils with nine or ten sharp snorts before she snuffles along a row of luggage pieces, all different makes and models. They're lined up against the back wall of a large hangar on a country road outside Hartford, Conn. This is where MSA Security trains what are known in the security trade as explosive detection canines, or EDCs. Most people call them bomb dogs.

Dogs are recognized as premier explosives detection systems. They are reliable, friendly, love to work, and are portable. Dogs have some intrinsic weaknesses such as sensory fatigue and limited detection lifespan, but still are preferred by law enforcement and the military for illicit substance detection. For example, the ATF have K-9s deployed for detection in over 13 different countries. Training K-9s is difficult because of limited targeted training aids and contamination (training on the impurity). In addition, shape recognition is not fully employed.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the forms disclosed and the application covers all modifications, equivalents, and alternatives falling within the spirit and scope of the apparatus, systems, and methods as defined by the claims.

Additive Manufacturing (AM) is used to make aids that target the training of K-9s to detect explosives. The process uses mixtures of explosives and matrices commonly used in AM. The explosives are formulated into a mixture using AM techniques and equipment. The explosive concentrations are kept less than 10% by wt. of the mixture to conform to requirements of shipping and handling, although higher concentrations of explosives are viable. The matrices vary but the most desirable are those that have no volatile compound signatures after processing. The training aids are printed in a variety of form and shapes, consistent with meeting K-9 training protocols.

In general, the inventors' apparatus, systems, and methods utilizes the technology of AM printing to produce unusual materials with special properties. K-9 explosives training aids have to minimally meet the following requirements:) 1) low concentration of explosive or explosive mixture (this allows handling and transportation without special requirements); 2) non-volatile matrix (so the K-9 will not be trained on a false signature); 3) flexibility in form (so the aid can be used in various configurations and applications). Current technology meets some of these requirements. There are companies (few), such as NESTT and ScentLogic, that produce training aids that can be shipped and handled normally, but the list of explosives is somewhat limited, including no real improvised explosive mixtures. Matrices are available, but these are usually limited to silica and thick gel hydrocarbons. The flexibility of form is also limited as the current aids are generally pastes or powders that must have secondary containment, such as a bag, or applied as a smear.

AM printed training aids have many advantages over current training aids. They can be printed in low concentrations to meet DOT requirements as non-hazardous, non-explosive materials. They can be printed in any shape, such as a dog bone, box or hand grenade. They can be printed with a large variety of matrices that are more realistic to actual threat environments, such as clays, ceramics, plastics. They can be printed then processes with little or no volatile backgrounds, for example, several printing formulations are water based. They can be printed with a large array of different explosive materials. The open porous structure allows ample access of inner concentrations of explosives. They can be printed as laminates with two components of an improvised explosive (oxidizer and fuel) without the components being mixed or co-mingled. They can be printed on-demand. With possible selection of printing equipment, they could be printed in the field. They could be printed with other illicit target materials so they could be used for K-9 training aids for drugs, chemical weapons, and environmental hazards.

The inventors' apparatus, systems, and methods have been described as addressing the need for a K-9 training aid when the target for the training aid is explosives. The technology can be extended to any material that could be a target in K-9 detection. If there is a desire to use K-9s to identify drugs being smuggled, these methods can be applied to produce K-9 drug training aids using manufacture methods comparable to these. If there is a desire to use K-9s to identify fugitive emissions from industrial equipment, these methods can be applied to produce K-9 training aids using manufacture methods comparable to these. These manufacturing methods can be applied to produce training aids to almost any material targeted for detection by K-9s.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
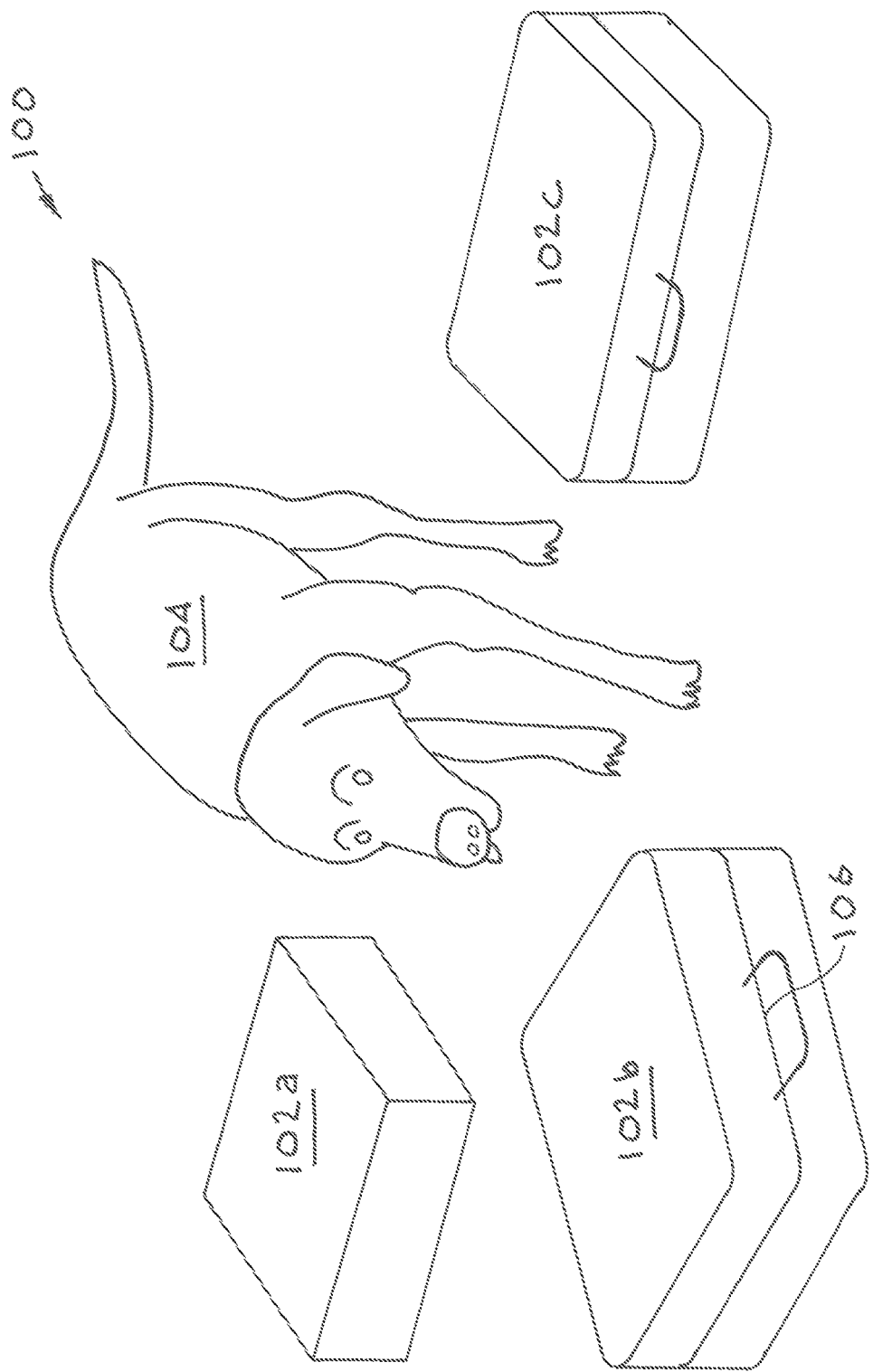
FIG. 1 shows a trained K-9 in an operation of actively detecting explosives or explosives residue in connection with a variety of pieces of luggage.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have been involved in AM research technology for some time. Various research efforts have led the inventors to accumulate vast expertise in AM as adapted to security applications. Recently, the application of AM printing explosives has come to fruition. Developing safe handling and manufacturing methods and adapting formulation to include explosives has been recently successful. This technology is only possible because of the long history of the inventors working with explosives on many different levels, and knowledge of the safe handling and formulation of explosives in general. Combining AM with the safe guards of handling explosives was a natural extension to produce the training aid focus.

The increased threats of violence unsettle us all. Often times these threats are carefully hidden from human detection, but thanks to explosives detection K-9s, they can still be found. The explosives detection K-9 can be trained and conditioned to detect explosives, explosives residue, and post blast evidence. As a bonus, because of their conditioning to smokeless powder and other explosive fillers explosives detection K-9s can detect firearms and ammunition hidden in containers and vehicles, on persons and buried underground.

As illustrated in FIG. 1, a trained K-9 is shown in an operation of actively detecting explosives or explosives residue in connection with a variety of pieces of luggage 102a, 102b and 102c. The operation is designated generally by the reference numeral 100. In the operation 100 a dog 104 is drawn to the suitcase 102b because it contains an explosive or explosives residue 106.

Dogs can be trained to accomplish many task including detecting materials such as explosives and drugs. Scent training is used to train a dog to recognize a target. Repeatedly having the dog find the target will give the dog the ability to detect the target when working in field. Successful detection of the target earns the dog a food and praise reward, which encourages repetition.

Figure 2:
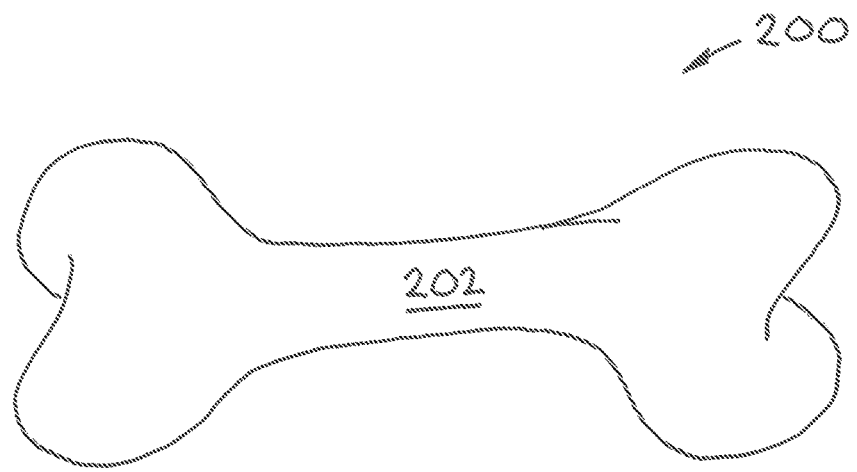
FIG. 2 is an example of the use of a K-9 training aid for teaching the dog to recognize a target.

Referring to FIG. 2 an example of the use of a K-9 training aid for teaching the dog to recognize a target. This example is designated generally by the reference numeral 200. The training aid in this instance is a bone 202 that is used for early training. The bone 202 is something that the dog recognizes and has favorable attitudes towards.

The inventors have developed apparatus, systems, and methods using AM to make aids that are used in the training of K-9s to detect explosives. The inventors' process uses mixtures of explosives and matrices commonly used in AM. The explosives are formulated into a mixture with the matrix and printed using AM techniques and equipment. The explosive concentrations are kept less than 10% by wt. of the mixture to conform to requirements of shipping and handling, although higher concentrations of explosives are viable. The matrices vary but the most desirable are those that have no volatile compound signatures after processing. The training aids are printed in a variety of forms and shapes, consistent with meeting K-9 training protocols.

Figure 3:
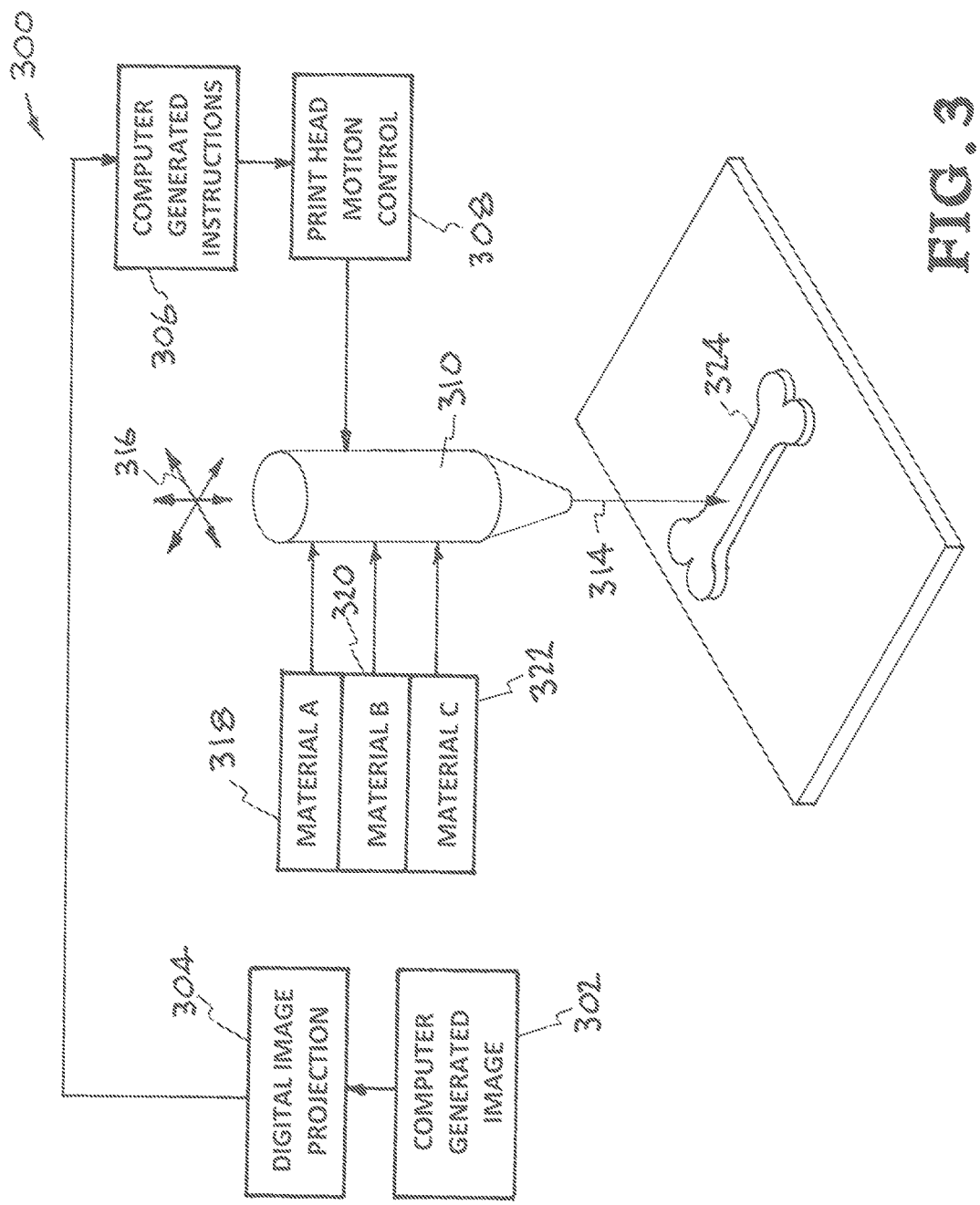
FIG. 3 is an illustration showing one embodiment of the inventors' apparatus, systems, and methods using AM to make aids that used in the training of K-9s to detect explosives.

Referring now to FIG. 3, an illustration shows one embodiment of the inventors' apparatus, systems, and methods using AM to make aids that used in the training of K-9s to detect explosives. The embodiment is designated generally by the reference numeral 300. The embodiment 300 uses AM in at least one step of a process to produce a K-9 training aid that can be used to train dogs to detect explosives.

The embodiment 300 provides an AM system for selectively processing feedstock materials in a layer-by-layer process to produce the K-9 training aid. Processing includes, but is not limited to, producing a computer-generated image 302 of the training aid to be produced, projecting a digital image 304 of the training aid, using a computer 306 to provide print head motion control 308 to a print head 310 that is moved as indicated by the arrows 316 to provide an extrusion 314 and build the training aid 324. Feed stocks of Material A 318 or Material B 320 or Material C 322 is fed to the print head 310 to produce the layers being printed. In other variations, the print head is fixed and the carriage is moved relative to the print head.

Initially a 3D model of the desired product (training aid 324) is designed by any suitable method, e.g., by bit mapping or by computer aided design (CAD) software at a PC/controller. The CAD model of the desired product (training aid 324) is electronically sliced into series of 2-dimensional data files, i.e. 2D layers, each defining a planar cross section through the model of the desired product. The sliced layer thickness can vary depending on the spatial resolution of layer printing. The digital images are used in the AM system 300 to produce the final product. The digital images provide a digital image projection 304 of each layer. The digital image projection 304 is fed to a computer that provides computer generated instructions 306. The computer-generated instructions 306 are fed to a print head motion control 308 that moves the print head 310. Layers of the feedstock (Material A 318 or Material B 320 or Material C 322) are printed sequentially onto a substrate in a layer by layer process to produce the final product (training aid 324).

Figure 4A:
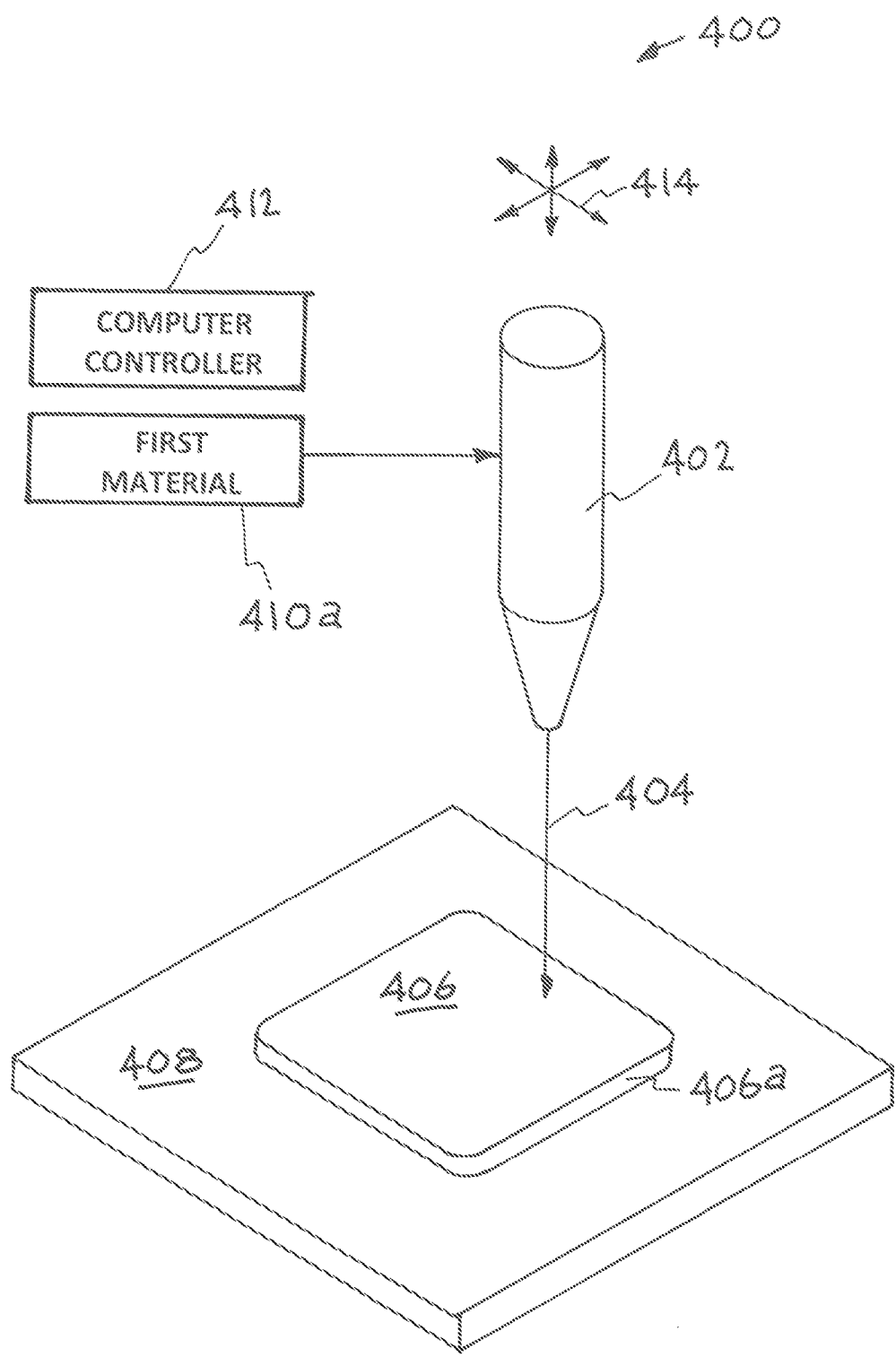
FIGS. 4A, 4B, and 4C illustrate another embodiment of the inventors' apparatus, systems, and methods using AM to make aids used in the training of K-9s to detect explosives.
Figure 4B:
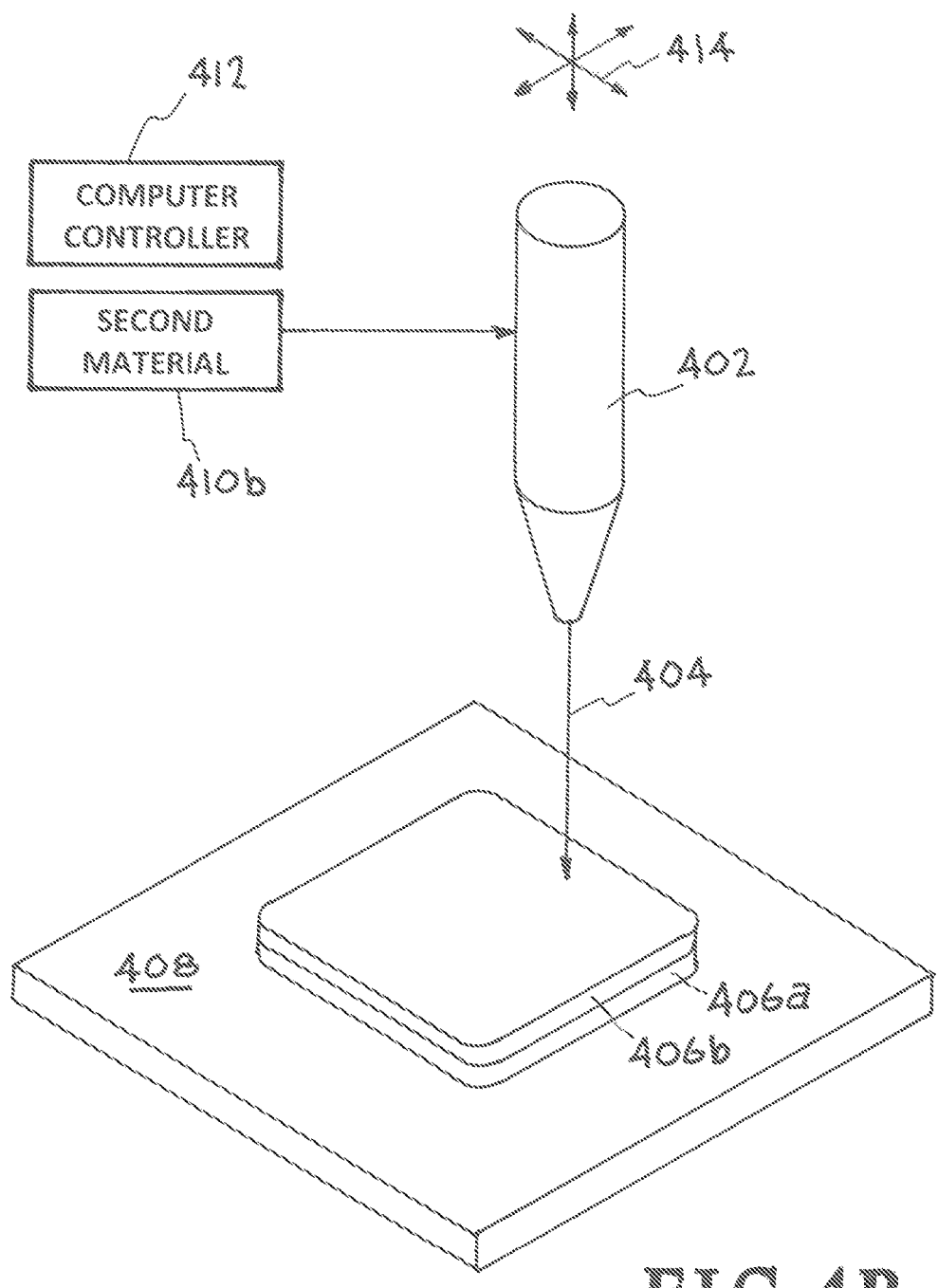
Figure 4C:
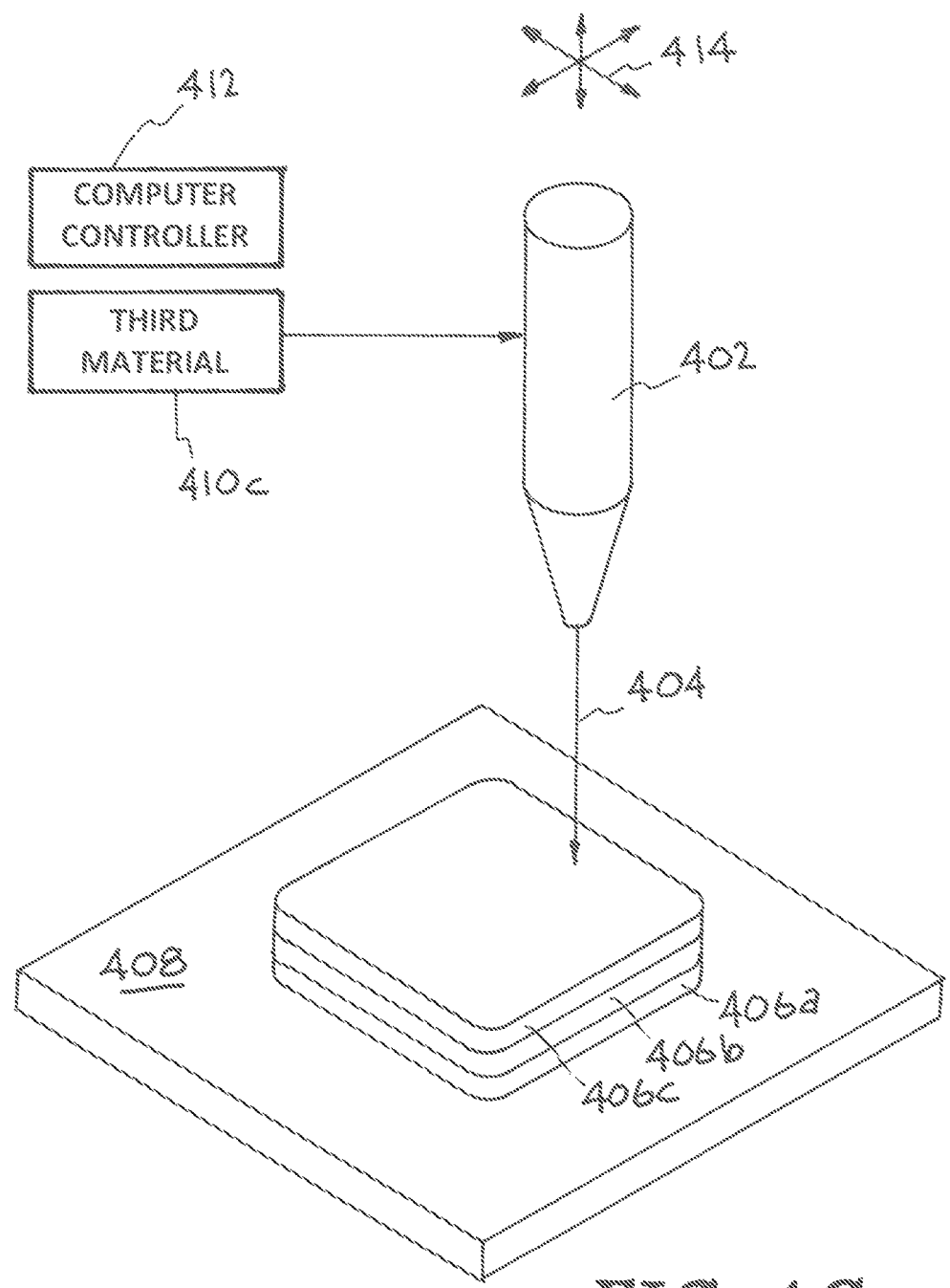

FIGS. 4A, 4B and 4C illustrate another embodiment of the inventors' apparatus, systems, and methods using AM to make aids used in the training of K-9s to detect explosives. This embodiment is designated generally by the reference numeral 400. The embodiment 400 uses AM to produce a K-9 training aid that can be used to train dogs to detect explosives.

The embodiment 400 provides an AM system for selectively processing separate feedstock materials in a layer-by-layer process to produce a K-9 training aid. A digital image of the training aid to be produced is created using a computer. The digital image is used to control print head motion and provide an extrusion to build the training aid in a layer-by-layer process.

Referring now to FIG. 4A, the system 400 is illustrated in a first operation wherein the print head 402 is moved as indicated by the arrows 414 to provide and print stream 404 to build the first layer 406a of the object 406 (training aid) on the build platform 408. The first material 410a of the print material supply is fed, to the print head 402 to produce the first layer 406a being printed. The computer controller 412 is directly or indirectly (i.e. by Blue Tooth) connected to all of the machine components and provides the instructions for producing the object 406.

Referring now to FIG. 4B, the system 400 is illustrated in a second operation wherein the print head 402 is moved as indicated by the arrows 414 to provide and print stream 404 to build the second layer 406b of the object 406 (training aid) on the build platform 408. The second material 410b of the print material supply is fed to the print head 402 to produce the second layer 406b being printed. The computer controller 412 is directly or indirectly (i.e. by Blue Tooth) connected to all of the machine components and provides the instructions for producing the object 406.

Referring now to FIG. 4C, the system 400 is illustrated in a third operation wherein the print head 402 is moved as indicated by the arrows 414 to provide and print stream 404 to build the third layer 406c of the object 406 (training aid) on the build platform 408. The third material 410c of the print material supply is fed to the print head 402 to produce the third layer 406b being printed. The computer controller 412 is directly or indirectly (i.e. by Blue Tooth) connected to all of the machine components and provides the instructions for producing the object 406.

Figure 5:
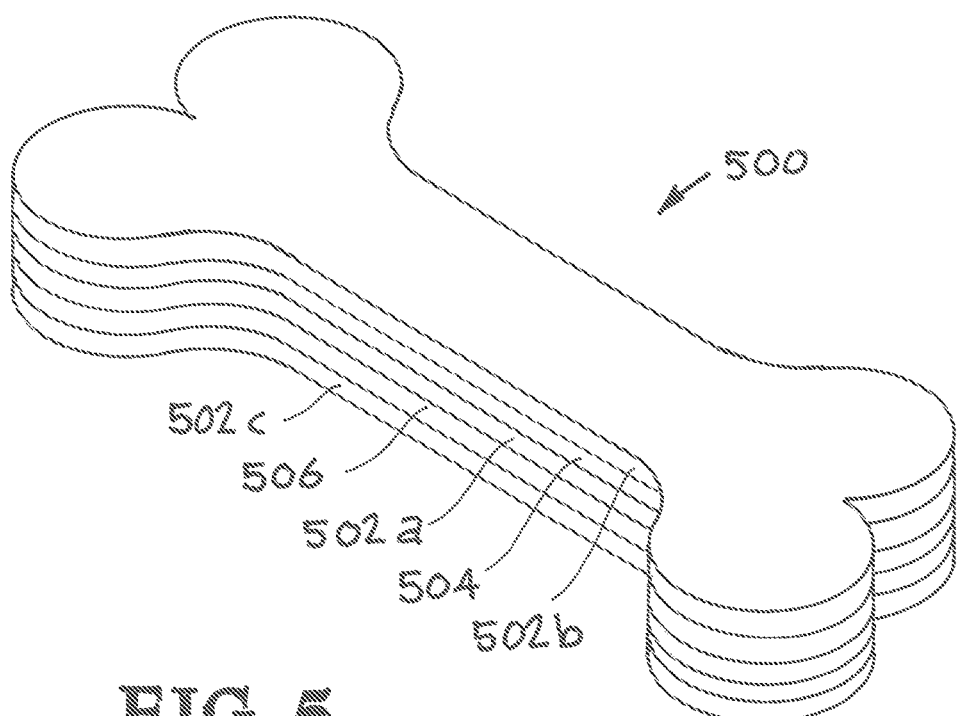
FIG. 5 is an example of an Additive Manufactured K-9 training aid that can be used for teaching a dog to recognize a target.

Referring to FIG. 5 an example of an Additive Manufactured K-9 training aid that can be used for teaching a dog to recognize a target is illustrated. This example is designated generally by the reference numeral 500. Dogs can be trained to accomplish many task including detecting materials such as explosives and drugs. Scent training is used to train a dog to recognize a target. Repeatedly having the dog find the target will give the dog the ability to detect the target when working in field. Successful detection of the target earns the dog a food and praise reward, which encourages repetition.

The training aid 500 illustrated in FIG. 5 has many advantages over current training aids. The training aid 500 can be printed in low concentrations to meet DOT requirements as non-hazardous, non-explosive materials. The training aid 500 can be printed in any shape, such as a dog bone, box or hand grenade. The training aid 500 can be printed with a large variety of matrices that are more realistic to actual threat environments, such as clays, ceramics, plastics. The training aid 500 can be printed then processes with little or no volatile backgrounds, for example, several printing formulations are water based. The training aid 500 can be printed with a large array of different explosive materials. The training aid 500 can be printed as laminates with two components of an improvised explosive (oxidizer and fuel) without the components being mixed or co-mingled. The training aid 500 can be printed on-demand. With possible selection of printing equipment, the training aid 500 can be printed in the field. Also, the training aid 500 could be printed with other illicit target materials so they could be used for K-9 training aids for drugs, chemical weapons, and environmental hazards.

The training aid 500 illustrated in FIG. 5 has an inner inert layer 502a that separates an oxidizer layer 504 from a fuel layer 506. An upper inert layer 502b and a lower inert layer 502c covers and seals the oxidizer layer 504 and the fuel layer 506. The oxidizer layer 504 is less than 10% by weight and the fuel layer 506 is less than 10% by weight and the training aid 500 conforms to requirements of shipping and handling. The training aid 500 is classified as non-hazardous material.

The first layer 502b is be an inert separator material. The second layer 504, for example, can be an oxidizer. The third layer 502a is be an inert separator material. The fourth layer 506, for example, can be a fuel. The fifth layer 502c is be an inert separator material. The printing process prints the second layer 504 and the fourth layer 506 separated by the third layer 502a made of an inert separator material. The second, third, and fourth layers are encased in inert separator materials layers 502b and 502c. Examples of the second oxidizer layer 504 and the fourth fuel layer 506 include those listed below.

Example 1

First Layer—Oxidizer 504—Ammonium Nitrate
Fourth Layer—Fuel 506—Fuel Oil

Example 2

First Layer—Oxidizer 504—Potassium Perchlorate
Fourth Layer—Fuel 506—Powdered Sugar Example 3

First Layer—Oxidizer 504—Potassium Nitrate
Fourth Layer—Fuel 506—Sulfur

Figure 6:
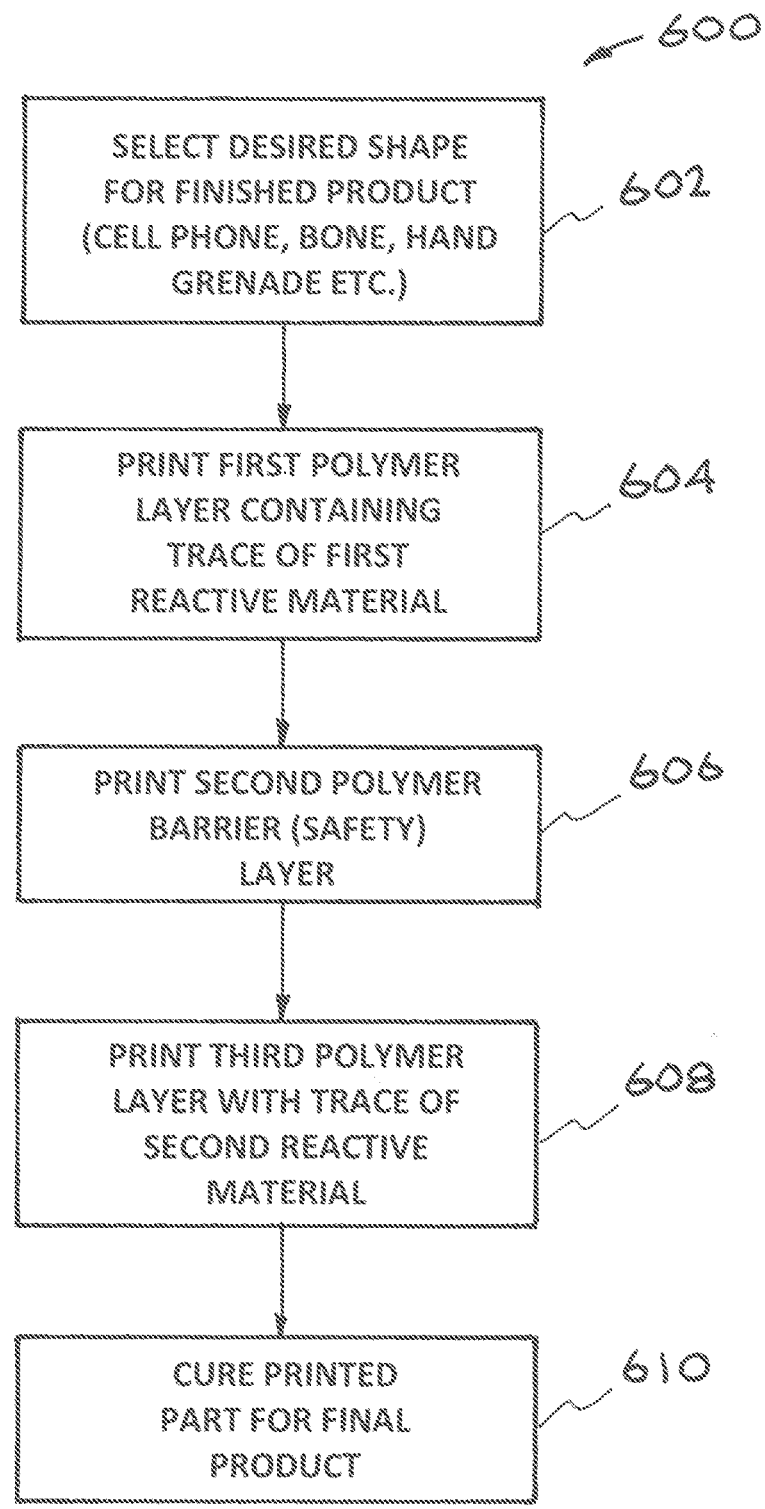
FIG. 6 is a flow chart that illustrates another embodiment of the inventors' apparatus, systems, and methods of using AM to make aids that used in the training of K-9s to detect explosives.

Referring now to FIG. 6, a flow chart illustrates another embodiment of the inventors' apparatus, systems, and methods of using AM to make aids that used in the training of K-9s to detect explosives. This additional embodiment is designated generally by the reference numeral 600. The embodiment 600 uses AM to produce a K-9 training aid that can be used to train dogs to detect explosives.

Step 602 comprises selecting the desired shape for finished product (i.e., cell phone, bone, hand Grenade etc.).

Step 604 comprises printing the first polymer layer containing traces of a first reactive material.

Step 606 comprises printing a second polymer barrier (safety) layer.

Step 608 comprises printing the third polymer layer containing traces of a second reactive material.

Step 610 comprise curing the printed green product to produce the final product.

Figure 7:
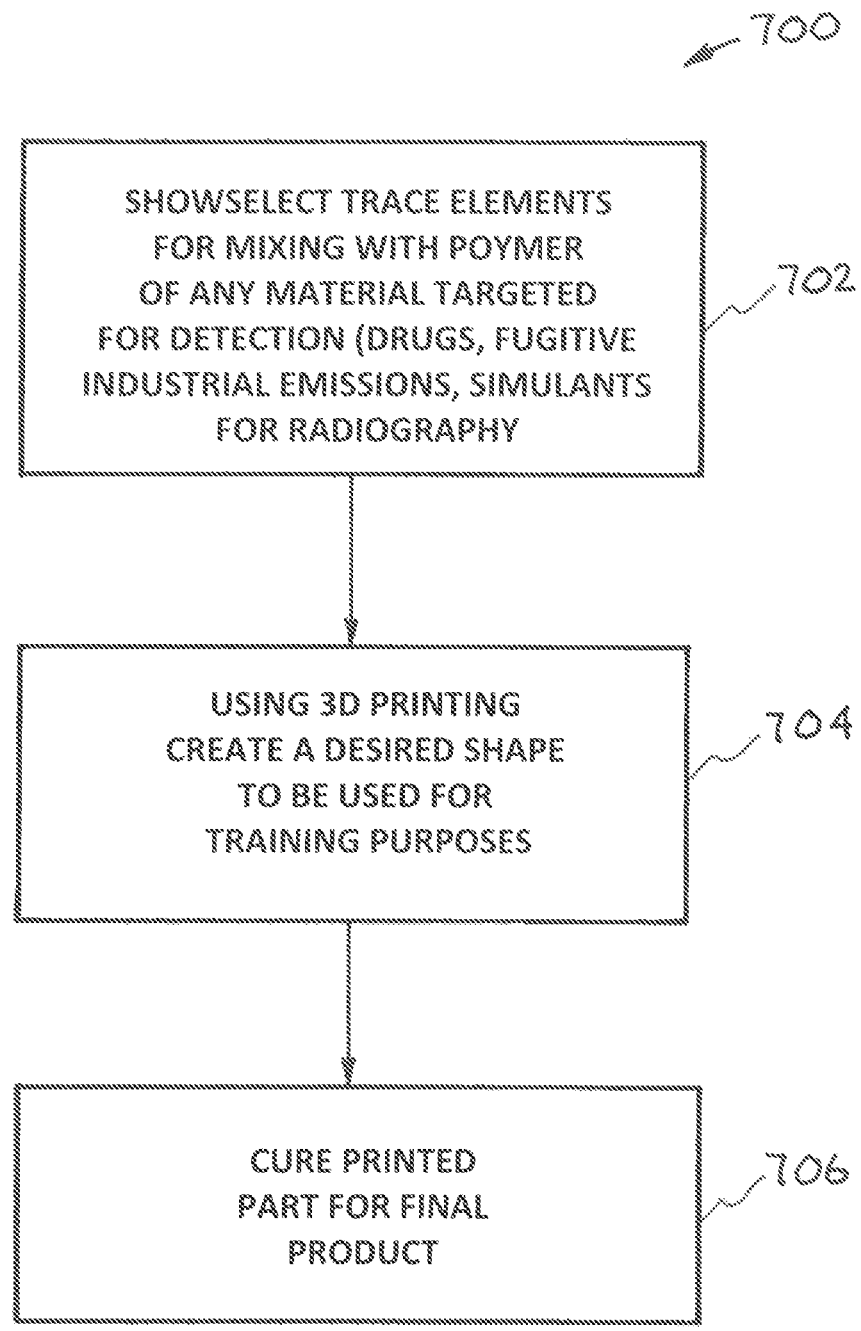
FIG. 7 is a flow chart that illustrates another embodiment of the inventors' apparatus, systems, and methods of using AM to make aids that used in the training of K-9s to detect explosives.

Referring now to FIG. 7, a flow chart illustrates another embodiment of the inventors' apparatus, systems, and methods of using AM to make aids that used in the training of K-9s to detect explosives. This additional embodiment is designated generally by the reference numeral 700. The embodiment 700 uses AM to produce a K-9 training aid that can be used to train dogs to detect explosives.

Step 702 comprises selecting trace elements for mixing with a polymer of any material targeted for detection (explosives, drugs, fugitive industrial emissions).

Step 704 comprises creating a desired shape to be used for training purpose.

Step 706 comprises curing the printed part to produce the final product.

Figure 8:
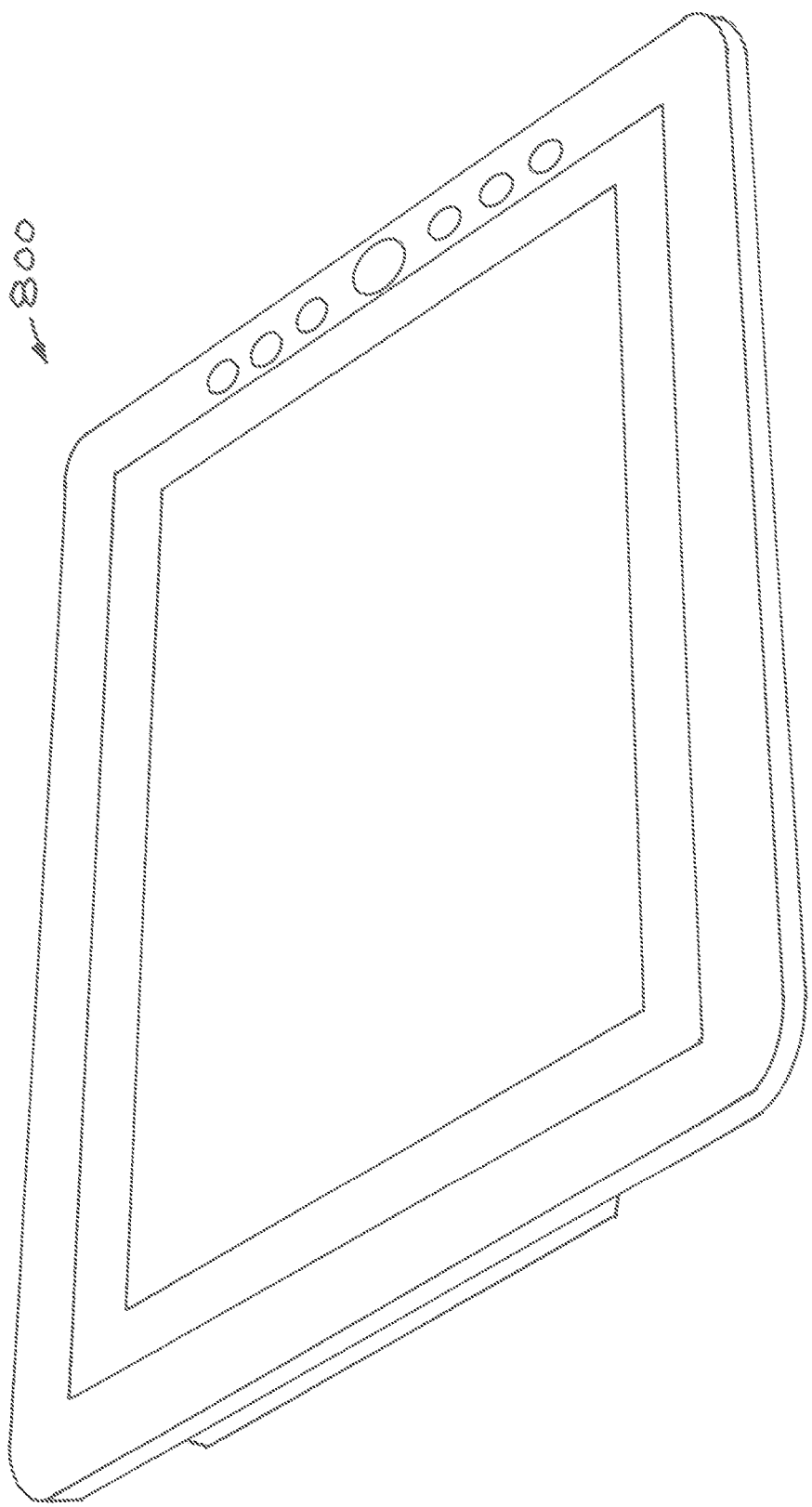
FIG. 8 shows a view of a notebook computer that has been printed by AM using penta-erythritol as a surrogate for penta erythritol tetra nitrate (PETN).

FIG. 8 shows a view of a notebook computer that has been printed using penta-erythritol as a surrogate for penta erythritol tetra nitrate (PETN). The penta-erythritol was added to the matrix at about 8 wt. %. The printing of the notebook computer demonstrates the ability of the AM process to produce objects that would be consider of interest to K-9 detection. These objects could be printed on-demand, depending upon the application, and provide a more sophisticated type of training aid that also represents object recognition.

Figure 9:
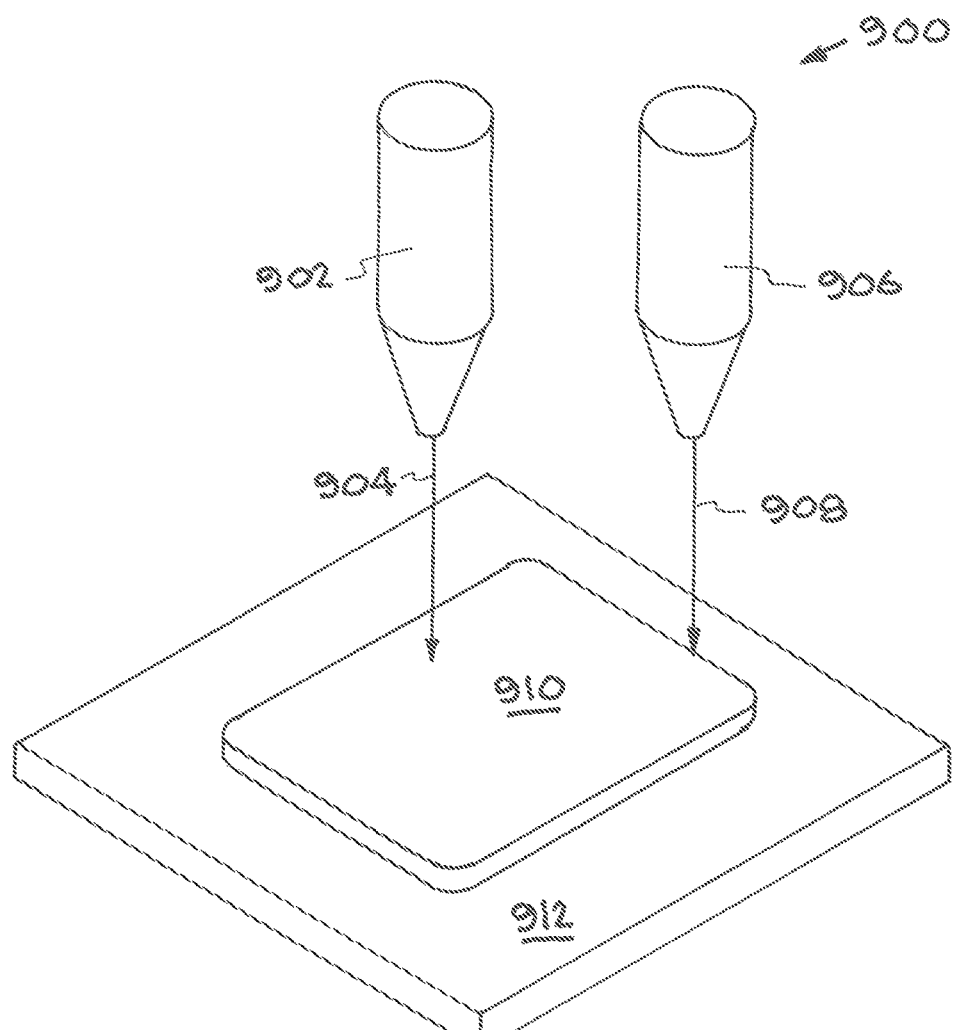
FIG. 9 is an illustration showing another embodiment of the inventors' apparatus, systems, and methods using AM to make aids that used in the training of K-9s to detect explosives.

FIG. 9 illustrates another embodiment of the inventors' apparatus, systems, and methods using AM to make aids used in the training of K-9s to detect explosives. This embodiment is designated generally by the reference numeral 900 and focuses on the detection of standard commercial and military explosives.

The embodiment 900 provides an AM system for selectively processing separate explosive material feedstock and separator material feedstock in a layer-by-layer process to produce a K-9 training aid. A digital image of the training aid to be produced is created using a computer. The digital image is used to control print head motion and provide an extrusion to build the training aid in a layer-by-layer process.

The system 900 is illustrated in operation wherein a first print head 902 and a second print head 906 are moved to provide and print streams 904 and 908 to build the training aid 910 on the build platform 912. The material in the print head 902 is a separator material that produces the body portion of the training aid 910 being printed. The material in the print head 906 is explosive material. The print head 906 places separate allocates of the explosives separated from one another in the body portion of the training aid 910 being printed.

Figure 10A:
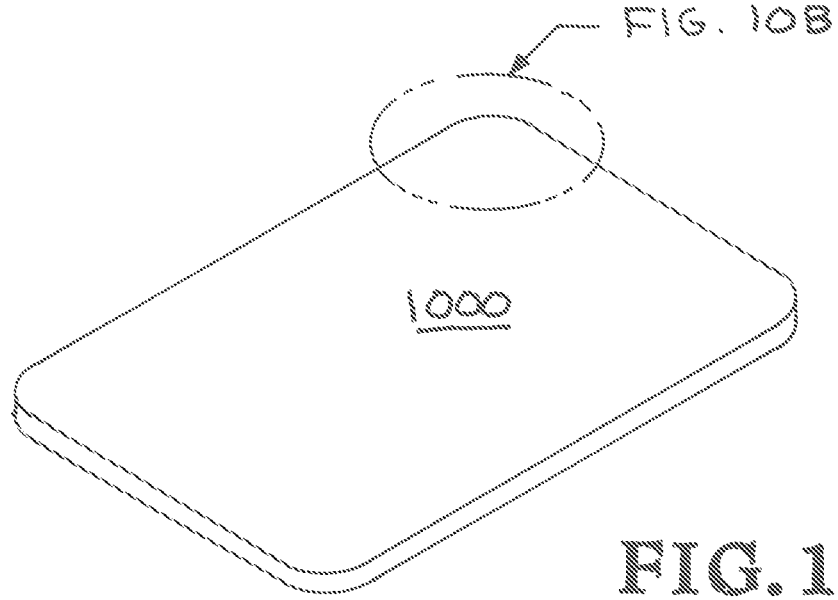
FIGS. 10A and 10B illustrate another embodiment of the inventors' apparatus, systems, and methods using AM to make aids used in the training of K-9s to detect explosives.
Figure 10B:
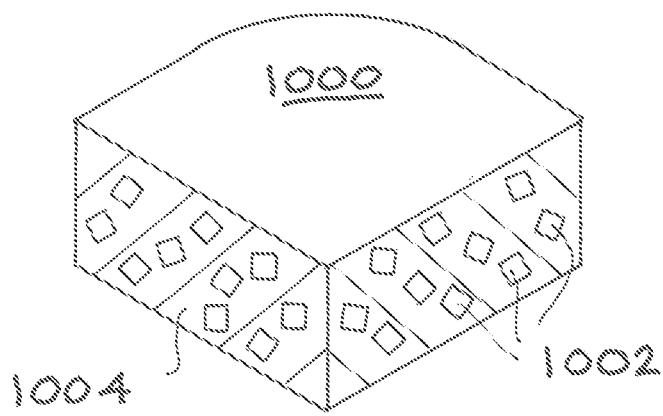

FIGS. 10A and 10B provide more details of the training aid produced by the AM system illustrated in FIG. 9. The training aid is designated generally by the reference numeral 1000.

FIG. 10A shows the training aid 1000 with the portion in the circle illustrated in greater detail in FIG. 10B. The material 1004 is a separator material that produces the body portion of the training aid 1000. The material 1002 is explosive material in the form of standard commercial and military explosives. The explosive material 1002 can include the following:

Military Explosives
C4
HMX
PETN
RDX
Semtex
Commercial Explosives
ANAL
ANFO
Black Powder
Dynamite
Nitroglycerin
Smokeless Powder
TNT
Urea Nitrate The explosive material 1002 is positioned in separate allocates of the explosives separated from one another in the body portion of the training aid 1000. The explosive material 1002 constitutes less than 10% of the training aid 1000. The explosive concentration is kept less than 10% by wt. of the training aid to conform to requirements of shipping and handling. The training aid 1000 is printed in low concentrations to meet DOT requirements as non-hazardous, non-explosive materials. The explosives 1002 are isolated in the inert separator material 1002.

Then I first meet a likable young Labrador named Merry, she is clearing her nostrils with nine or ten sharp snorts before she snuffles along a row of luggage pieces, all different makes and models. They're lined up against the back wall of a large hangar on a country road outside Hartford, Conn. This is where MSA Security trains what are known in the security trade as explosive detection canines, or EDCs. Most people call them bomb dogs.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The claims are:

1. An apparatus, comprising:
a K-9 training aid having multiple components;
an explosive material component comprising one of said components, wherein said explosive material component comprising one of said components includes a layer made of an oxidizer material and a layer made of a fuel material; and
a separator material component comprising another of said components.

2. The apparatus of claim 1 wherein said explosive material component comprising one of said components includes an additive manufactured layer made of an oxidizer material and an additive manufactured layer made of a fuel material.

3. The apparatus of claim 1 wherein said additive manufactured layer made of an oxidizer material is less than ten percent of the apparatus by weight.

4. The apparatus of claim 1 wherein said additive manufactured layer made of a fuel material is less than ten percent of the apparatus by weight.

5. The apparatus of claim 1 wherein said additive manufactured layer made of an oxidizer material comprises potassium nitrate.

6. The apparatus of claim 1 wherein said additive manufactured layer made of a fuel material comprises sulfur.

7. The apparatus of claim 1 wherein said explosive material component comprising one of said components is less than ten percent of the apparatus by weight.

8. A K-9 training aid apparatus, comprising:
an additive manufactured layer made of an oxidizer material,
an additive manufactured layer made of a fuel material, and
an additive manufactured layer made of an inert material that separates said layer made of an oxidizer material and said layer made of a fuel material.

9. The K-9 training aid apparatus of claim 8 wherein said additive manufactured layer made of an oxidizer material is less than 10% by weight.

10. The K-9 training aid apparatus of claim 8 wherein said additive manufactured layer made of a fuel material is less than 10% by weight.

11. The K-9 training aid apparatus of claim 8 wherein said additive manufactured layer made of an oxidizer material comprises potassium nitrate.

12. The K-9 training aid apparatus of claim 8 wherein said additive manufactured layer made of a fuel material comprises sulfur.

13. A method of making a K-9 training aid, comprising the steps of:
printing a K-9 training aid having multiple components,
printing an explosive material component comprising one of said components, and
printing a separator material component comprising another of said components.

14. The method of making a K-9 training aid of claim 13 wherein said step of printing an explosive material component comprising printing an explosive material component that is less than ten percent of said K-9 training aid by weight.

* * * * *